July 21, 1925.
M. A. LANE
1,546,389
VEHICLE BRAKE HANDLE ATTACHMENT
Filed Oct. 24, 1924
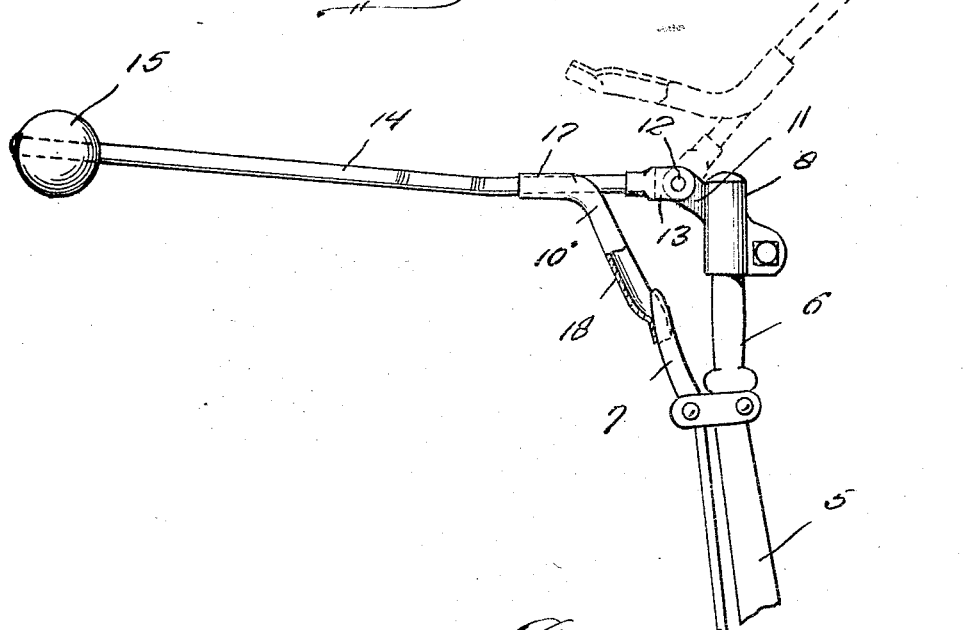
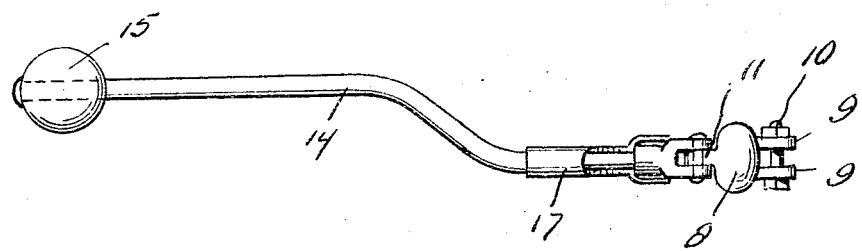
M. A. Lane,
Inventor
By Clarence A. O'Brien
Attorney Patented July 21, 1925.

1,546,389

UNITED STATES PATENT OFFICE.

MAJOR A. LANE, OF KANSAS CITY, MISSOURI.

VEHICLE BRAKE-HANDLE ATTACHMENT.

Application filed October 24, 1924. Serial No. 745,643.

*To all whom it may concern:*

Be it known that I, MAJOR A. LANE, a citizen of the United States, residing at Kansas City, in the county of Jackson and State of Missouri, have invented certain new and useful Improvements in a Vehicle Brake-Handle Attachment, of which the following is a specification.

This invention relates generally to brake operating handles and has more particular reference to an attachment therefor.

The primary object of the invention resides in the provision of an attachment for the usual brake handle of the Ford type automobile wherein the brakes of the rear wheels may be actuated in a convenient manner for thereby enabling these brakes to be employed frequently in the stopping of the machine which is at the present time a feature not carried out in the operation of Ford automobiles due mainly to the fact that these brake levers are at an inconvenient position, namely at a relatively remote distance from the operator of the vehicle.

An additional object of the invention is to provide an attachment of this character that may be readily disposed upon the hand brakes of a Ford automobile and one that may be employed in the releasing of the brake latch as well as the movement of the lever in opposite direction.

A further object of the invention is to provide an attachment for vehicle hand brake levers that may be moved to an out-of-the-way position whenever necessary.

A still further and important object is to provide an article of this character that may be manufactured and marketed at low cost and one that is well adapted for the purposes designated.

With the foregoing and other objects in view as the nature of the invention will be better understood the same comprises the novel form, combination and arrangement of parts hereinafter more fully described, shown in the accompanying drawing and claimed.

In the drawing, wherein like reference characters indicate corresponding parts throughout both of the views, Figure 1 is side elevational view, partly in cross section of a vehicle brake handle attachment constructed in accordance with the present invention, the same being shown as being actually in use, the dotted line position of the attachment disclosing the same in its inoperative position, and Figure 2 is a top plan view thereof.

Now having particular reference to the drawing, 5 indicates the usual hand actuated lever of the rear wheel brakes of a Ford type automobile, the upper end of which is formed with a handle member 6, there being attached to said lever 5 the usual lever latch (not shown) that is operated by the handle member 7, that is attached to said lever 5 in the manner as indicated in Figure 1.

My invention per se comprises a sheet metal cap or casting 8 that is open at its lower end and being of a shape similar to the shaft of the lever handle portion 6 and adapted to fit over the upper end of this lever handle portion as clearly shown in Figure 1. This cap is split at its forward side and adjacent its lower end, the opposite edges of said split being formed with forwardly extending spaced ears 9—9 whereby the cap may be rigidly secured upon the member 6 through the medium of a bolt and nut connection 10.

Formed integrally with the upper end of this cap 8 and upon the rear side thereof is an upwardly and rearwardly extending ear 11 to which is pivotally secured as at 12 a yoke member 13 with which is associated the forward end of a control rod 14 that is in the normal position of my device extended rearwardly, the same being of such a length as to terminate at a point adjacent the driver of the vehicle, the free end of this rod being equipped with a hand knob 15 for an obvious purpose.

Rigidly attached to the rod 14 at a point adjacent said yoke 13 is an arm member 16, that is formed preferably from a tube of relatively stiff sheet metal, that encircles the rod at its rear bent end 17, this arm extending downwardly at 18 and being open as clearly shown the lower extreme end thereof adapted to engage over the adjacent edge of the latch actuating member 7 as clearly shown.

The normal operative position of my attachment is as shown in full lines in Figure 1, it being obvious that whenever it is desired to apply the rear wheel brakes all that is necessary is to grasp the knob 15 and pull rearwardly upon the rod 14 which will obviously draw the hand lever 5 rearwardly, and the same will be locked in that position through the medium of the usual latch. When it is desired to release the brake the operator merely forces downwardly upon the rod 14 which will swing the latch actuating lever 7 upon its pivot for obviously releasing the latch whereupon a forward movement of the rod will naturally move the lever 5 to a forward position. Whenever it is desired, the rod may be swung forwardly to the dotted line position of Figure 1 for allowing the occupant of the car to step out of the left hand side of the vehicle without being hindered by the rod 14.

It will thus be seen that I have produced a highly novel and efficient form of vehicle brake handle attachment primarily adapted for automobiles of the Ford type, it being nevertheless understood that this device may equally as well be provided upon or attached to hand brake levers employed in conjunction with other types of vehicles.

Having thus described the invention, what I claim is:—

In a vehicle brake handle attachment, a clamp member, a lever pivoted to the clamp member, and a tubular member bent intermediate its ends to provide an arm for receiving the lever, and a second arm cut away adjacent its ends to form an engaging portion for the release lever of the brake handle.

In testimony whereof I affix my signature.

MAJOR A. LANE.